US005373289A

United States Patent [19]

Ichinohe

[11] Patent Number: 5,373,289

[45] Date of Patent: Dec. 13, 1994

[54] METHOD AND SYSTEM FOR ACCESS TO A PAGING RADIO RECEIVER

[75] Inventor: Makoto Ichinohe, Tokyo, Japan

[73] Assignee: NEC Corporation, Tokyo, Japan

[21] Appl. No.: 825,495

[22] Filed: Jan. 24, 1992

[30] Foreign Application Priority Data

Jan. 24, 1991 [JP] Japan .................................... 3-23965

[51] Int. Cl.[5] ............................................... H04Q 7/00

[52] U.S. Cl. ........................... 340/825.56; 340/825.31; 340/311.1

[58] Field of Search ....................... 340/825.44, 825.31, 340/825.32, 311.1, 825.56; 379/102, 103, 168, 194, 195; 455/352; 395/425, 725

[56] References Cited

U.S. PATENT DOCUMENTS 4,677,434 6/1987 Fascenda .............................. 380/23
4,758,718 7/1988 Fujisaki et al. ...................... 235/487
4,839,628 6/1989 Davis et al. ....................... 340/311.1
4,870,411 9/1989 Lewiner et al. ................ 340/825.31
4,882,752 11/1989 Lindman et al. ....................... 380/25
5,060,263 10/1991 Bosen et al. ........................... 380/25
5,073,767 12/1991 Holmes et al. ................... 340/311.1
5,146,217 9/1992 Holmes et al. ................. 340/825.44

FOREIGN PATENT DOCUMENTS

WO9014646 11/1990 European Pat. Off. .

*Primary Examiner*—Donald J. Yusko
*Assistant Examiner*—Edward Merz
*Attorney, Agent, or Firm*—Sughrue, Mion, Zinn, Macpeak & Seas

[57] ABSTRACT

A paging radio receiver system includes a paging radio receiver having an EEPROM storing a predetermined specific pass word, and an access unit comprising an input apparatus, and a comparator comparing a pass word supplied from the input apparatus with the specific pass word, and an access circuit for access to the EEPROM. The comparator supplies an access enabling signal to the access circuit when the supplied pass word is equal to the predetermined specific pass word.

6 Claims, 5 Drawing Sheets

METHOD AND SYSTEM FOR ACCESS TO A PAGING RADIO RECEIVER

FIELD OF THE INVENTION

This invention relates to a method and system for access to a paging radio receiver, and more particularly to a method and system for access to a paging radio receiver in which a radio receiver employs an EEPROM (electrically erasable programmable ROM) for storing information such as a call number, etc.

BACKGROUND OF THE INVENTION

A conventional paging radio receiver system includes a paging radio receiver having an EEPROM (electrically erasable programmable ROM) for storing a predetermined specific call number, alarm signal patterns, etc., and an access unit for access to the EEPROM. The radio receiver is provided with a speaker and/or an LED (light emitting diode) for informing a callee (a pager carrier) of a call from a caller. The speaker generates sound information and the LED is turned on and off to provide visual information, respectively, in accordance with one of the stored alarm signal patterns, when a call number of a received signal is equal to the predetermined specific call number of the EEPROM.

According to the conventional paging radio receiver system, the access unit is connected to the radio receiver, so that the stored information is easily read from the EEPROM, and replaced therein by new information. This makes it easy to maintain the paging radio receiver, as compared to a paging radio system using a non-erasable and non-programmable ROM.

However, the conventional paging radio receiver has a disadvantage in that the EEPROM can be accessed by an unauthorized operator. That is, information stored in the EEPROM can be read and new information can be written in the EEPROM easily, respectively, by an unauthorized pager carrier, for instance, if the paging radio receiver system is stolen.

SUMMARY OF THE INVENTION

Accordingly, it is an object of the invention to provide a method and system for access to a paging radio receiver in which unauthorized access to an EEPROM is avoided in a radio receiver.

According to a first feature of the invention, a paging radio receiver system includes:

a paging radio receiver which is provided with an EEPROM storing a predetermined specific pass word; and an access unit comprising an input apparatus, and a first comparator for comparing a pass word supplied from the input apparatus with the specific pass word, and an access circuit to gain access to the EEPROM;

wherein the first comparator supplies an access enabling signal to the access circuit when the supplied pass word is equal to the predetermined specific pass word.

According to a second feature of the invention, a method for access to a paging radio receiver, comprising the steps of:

comparing an input pass word supplied by an operator with a predetermined specific pass word stored in a paging radio receiver; and acquiring access to an EEPROM provided in the paging radio receiver, when the input pass word is equal to the predetermined specific pass word.

BRIEF DESCRIPTION OF THE DRAWINGS

The invention will be explained in more detail in conjunction with appended drawings; wherein.

DESCRIPTION OF THE PREFERRED EMBODIMENTS

Figure 1:
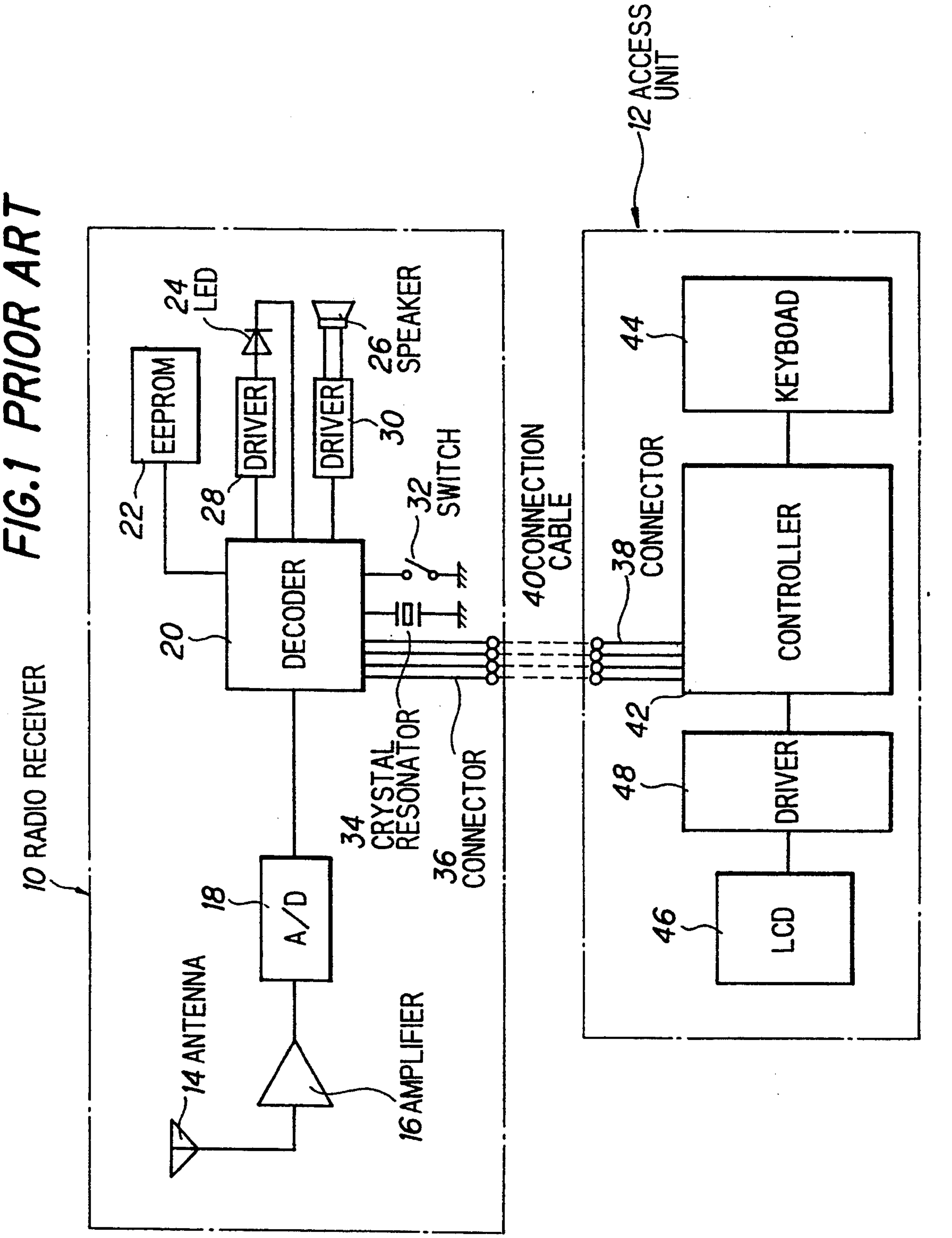
FIG.1 PRIOR ART
FIG. 1 is a block diagram showing a conventional paging radio receiver system.

Before describing a paging radio receiver system according to the invention, the briefly aforementioned conventional paging radio receiver system will be explained in conjunction with FIG. 1. The conventional paging radio receiver system includes a radio receiver 10 for receiving a paging radio signal and an access unit 12 for access to an EEPROM in the radio receiver.

The radio receiver 10 includes an antenna for receiving a radio wave, an amplifier 16 connected at an input to the antenna 14 for amplifying a received signal, an analog-digital converter 18 connected at an input to an output of the amplifier 16 for amplifying a waveform of the received signal, a decoder 20 connected at an input to the A/D converter 18, an EEPROM (electrically erasable programmable ROM) 22 connected to the decoder 20 for storing a predetermined specific call number and alarm signal patterns, etc., an LED (light emitting diode) 24, a speaker 26, two drivers 28 and 30 each connected at inputs to the decoder 20 for driving the LED 24 and the speaker 26, respectively, a switch 32 connected to the decoder 20 for controlling operation of the radio receiver 10, a crystal resonator 34 connected to the decoder 20 for supplying a reference clock signal, and a connector 36 connected to the decoder 20.

The access unit 12 includes a connector 38 to be connected to the connector 36 by a connection cable 40, a controller 42, a keyboard 44 connected to the controller 42, an LCD (liquid-crystal display) 46, and an LCD driver 48 connected between the controller 42 and the LCD 46.

In operation, when a radio signal is received at the antenna 14, the received signal is amplified and demodulated by the amplifier 16 and the A/D converter 18. The signal from the A/D converter 18 is determined whether it includes a call number which is equal to the predetermined specific call number of the EEPROM 22 or not by the decoder 20 in synchronism with the reference clock supplied from the crystal resonator 34. At this time, when the received call number is equal to the predetermined specific call number, the LED 24 and/or the speaker 26 are driven.

When the information stored in the EEPROM 22 is read or a new information is written into the EEPROM 22, the connectors 36 and 38 are connected by the connection cable 40, and an access instruction of read or write is supplied from the keyboard 44 to the controller 42, so that the information is displayed on the LCD 46.

According to the conventional paging radio receiver system, however, there is a disadvantage in that the information stored in the EEPROM 22 can be accessed by an unauthorized operator. That is, the information stored in the EEPROM 22 can be read and new information can be written in the EEPROM 22 by an unauthorized pager carrier, for instance, if the paging radio receiver system is stolen.

Figure 2:
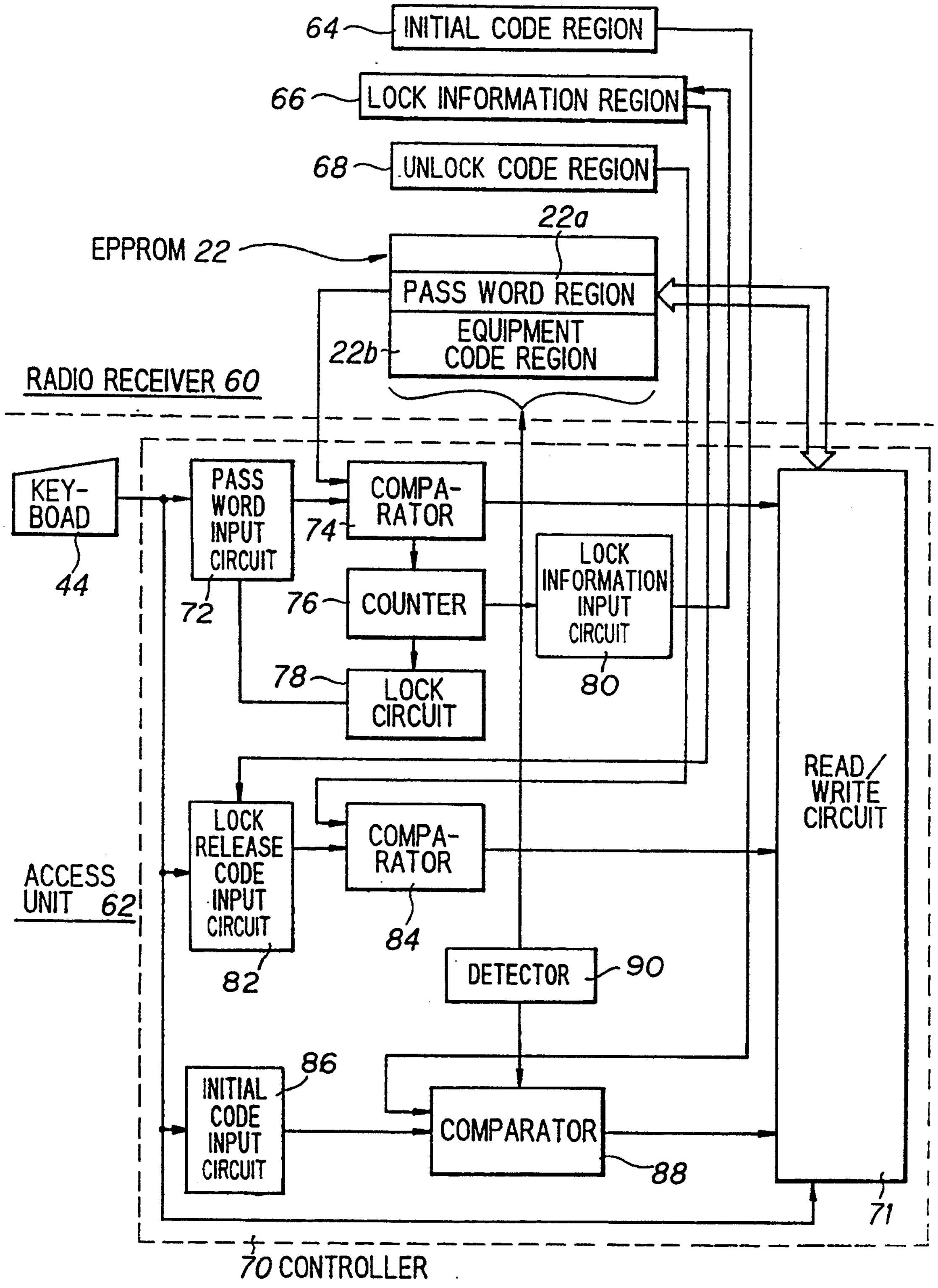
FIG. 2 is a block diagram showing a paging radio receiver system of a preferred embodiment according to the invention.

Next, a paging radio receiver system of a preferred embodiment according to the invention will be explained in conjunction with FIG. 2 showing the characteristic structure of the invention. A paging radio receiver system includes a radio receiver 60 and an access unit 62.

The radio receiver 60 includes an EEPROM 22 (electrically erasable programmable ROM) having a pass word region 22*a* storing a predetermined specific pass word and an equipment code region 22*b* storing a predetermined specific equipment code, and a RAM having an initial code region 64 storing a predetermined initial code, a lock information region 66 storing information whether the EEPROM 22 is accessible or not, and an unlock code region 68 storing a predetermined specific code for unlocking a lock state of the EEPROM 22. The specific unlock code is more complicated in code formation than the specific pass word so that a lock state can not be unlocked easily. In the same structure configuration as the conventional radio receiver 10 shown in FIG. 1, the radio receiver 60 includes an antenna 14, an amplifier 16, an analog-digital converter 18, a decoder 20, an LED 24, a speaker 26, two drivers 28 and 30, a switch 32, a crystal resonator 32, and a connector 36 to be connected with the access unit 62, although not shown in FIG. 2.

The access unit 62 includes a keyboard 44 and a controller 70. The access unit 62 further includes a connector 38, an LCD 46 and an LCD driver 48 in the same structure configuration as the conventional access unit 12 shown in FIG. 1, although not shown in FIG. 2. The controller 70 includes a read/write circuit 71 connected with the EEPROM 22 for access to the EEPROM 22, a pass word input unit (72, 72, 76, 78 and 80), an unlock code input unit (82 and 82), and an initial code input unit (86, 88 and 90).

The pass word input unit is composed of a pass word input circuit 72 connected to the keyboard 44, a comparator 74 connected at inputs to the input circuit 72 and to the pass word region 22*a* of the EEPROM 22 for comparing an input pass word from the input circuit 72 with the predetermined specific pass word from the pass word region 22*a*, a counter 76 connected at an input to the comparator 74 for counting the number of non-coincidences of the comparison, a lock circuit 78 connected at an input to the counter 76 for locking an input of the pass word, and a lock information input circuit 80 connected at an input to the counter 76 and at an output to the lock information region 66 of the EEPROM 22 for supplying a lock information.

The unlock (lock release) code input unit is composed of a lock release code input circuit 82 connected at inputs to the keyboard 44 and to the lock information region 66, and a comparator 84 connected at inputs to the input circuit 82 and to the unlock code region 68 for comparing an input unlock code with the predetermined unlock code and supplying an output signal to the read/write circuit 71.

The initial code input unit is composed of an initial code input circuit 86 connected at an input to the keyboard 44 for supplying an initial code for enabling the read/write circuit 71 to acquire access to the EEPROM 22, a comparator 88 connected at two of inputs to the input circuit 86 and the initial code region 64 for comparing an input initial code with the predetermined initial code, and a detector 90 connected to the EEPROM 22 and the comparator 88 for judging whether any information is stored in the EEPROM 22 or not.

The read/write circuit 71 reads information stored in the EEPROM 22 and writes new information into the EEPROM 22 in accordance with signals from the comparators 74, 84 and 88.

Figure 3:
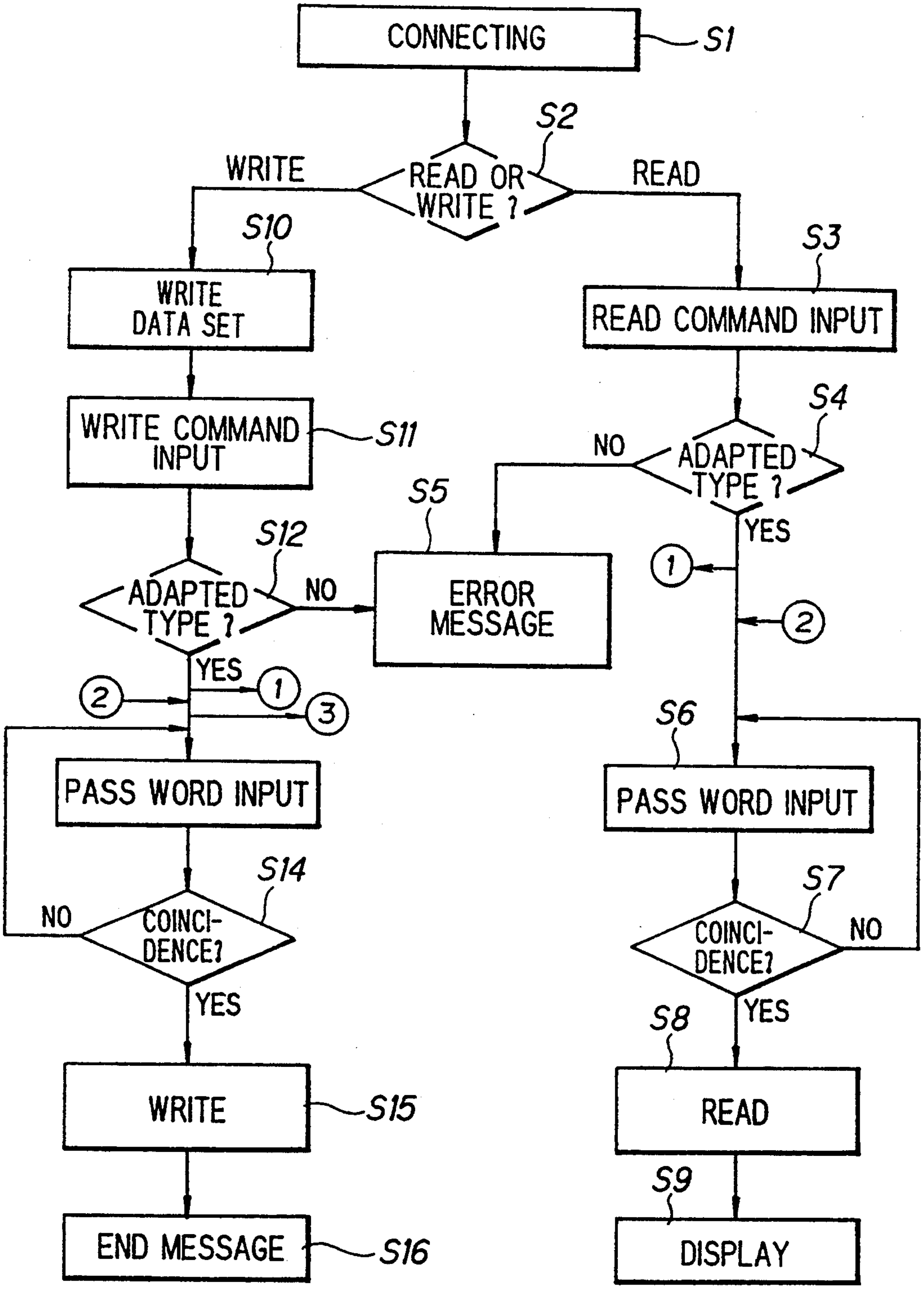
FIG. 3 is a flow chart showing first partial operation of the preferred embodiment.

Next, basic operation of read and write will be explained in conjunction with FIG. 3. When the access unit 62 is connected to the radio receiver 60 by the connectors 36 and 38 and the connecting cable 40 (S1) the EEPROM 22 is accessed. Next, an operator selects either "read" or "write" (S2). At this time, if the operator selects "read" by operating the keyboard 44 (S3), the equipment numbers of the radio receiver 60 and of the access unit 62 are compared in the decoder 20 (S4). Then, if the access unit 62 is not adaptable for reading operation with the radio receiver 60, an error message is displayed on the LCD 46 (S5). On the other hand, when the access unit 62 is adaptable for reading operation with the radio receiver 60, an instruction message for input of a pass word is displayed on the LCD 46. Next, when a pass word is supplied to the keyboard 44 (S6) to the controller 42, the input pass word is compared with the predetermined specific pass word of the pass word region 22*a* (S7). At this time, when the two pass words are equal, stored information is read from the EEPROM 22 (S8) to be displayed on the LCD 46 (S9). On the other hand, if the two pass words are not equal, input operation of pass words is repeated.

When new information is to be written in the EEPROM 22, data to be written is set (S10) and a write command is supplied from the keyboard 44 to the controller 42 (S11). Next, the equipment numbers of the radio receiver 60 and of the access unit 62 are compared in the decoder 20 (S12). Then, if the access unit 62 is not adaptable for writing operation with the radio receiver 60, an error message is displayed on the LCD 46 (S5). On the other hand, when the access unit 62 is adaptable for writing operation with the radio receiver 60, an instruction message for input of a pass word is displayed on the LCD 46. Next, when a pass word is supplied from the keyboard 44 (S13) to the controller 42, the input pass word is compared with the predetermined specific pass word of the pass word region 22*a* (S14). At this time, when the two pass words are equal, new information is written into the EEPROM 22 (S15) and an end message is displayed on the LCD 46 (S16). If the two pass words are not equal, input operation of pass words is repeated in the same manner as the read mode.

Figure 4:
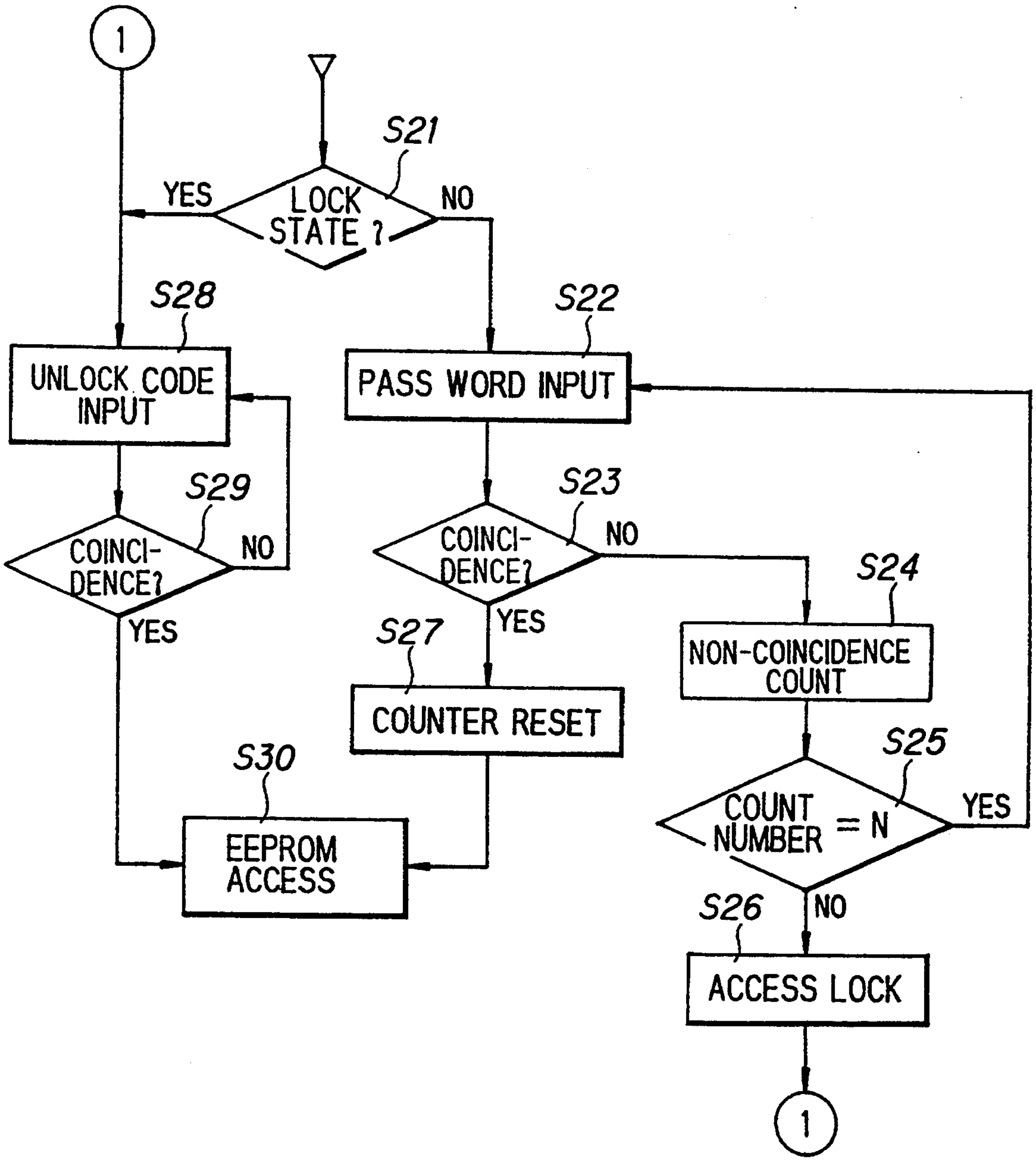
FIG. 4 is a flow chart showing second partial operation of the preferred embodiment.

Next, access lock and unlock (lock release) operation of the system will be explained in conjunction with FIG. 4 in addition to FIG. 3. When the access unit 62 is adaptable with the radio receiver 60, the pass word input circuit 72 is determined whether it is under a lock state or not (S21) in accordance with a signal from the lock information region 66. When the input circuit 72 is not locked, a pass word is supplied to the comparator 74 (S22), and the input pass word is compared with the predetermined specific pass word of the pass word region 22*a* (S23). At this time, if the two pass words are not equal, the number of non-coincidences is counted by the counter 76 (S24). After that, when the counted number comes to be equal to a predetermined number N, an input of a pass word is locked by the lock circuit 78, so that the access unit 62 can not access the radio receiver 60 (S26). Then, a lock state signal is supplied from the input circuit 80 to the lock information region 66. When the input pass word and the predetermined pass word become equal, the counter 76 is reset (S27), so that the EEPROM 22 can be accessed (S30).

On the other hand, when an input of a pass word is locked, an unlock code is input operation is carried out in the keyboard 44 (S28) in accordance with instruction displayed on the LCD 46. Next, the input unlock code supplied from the input circuit 82 is compared in the comparator 84 with the predetermined unlock code of the unlock code region 68 (S29). At this time, when these codes are not equal, input of unlock codes is repeated. When these codes are equal, the EEPROM 22 becomes accessible in accordance with the release of the lock state (S30). After that, the same operation as that shown in FIG. 3 is carried out.

Figure 5:
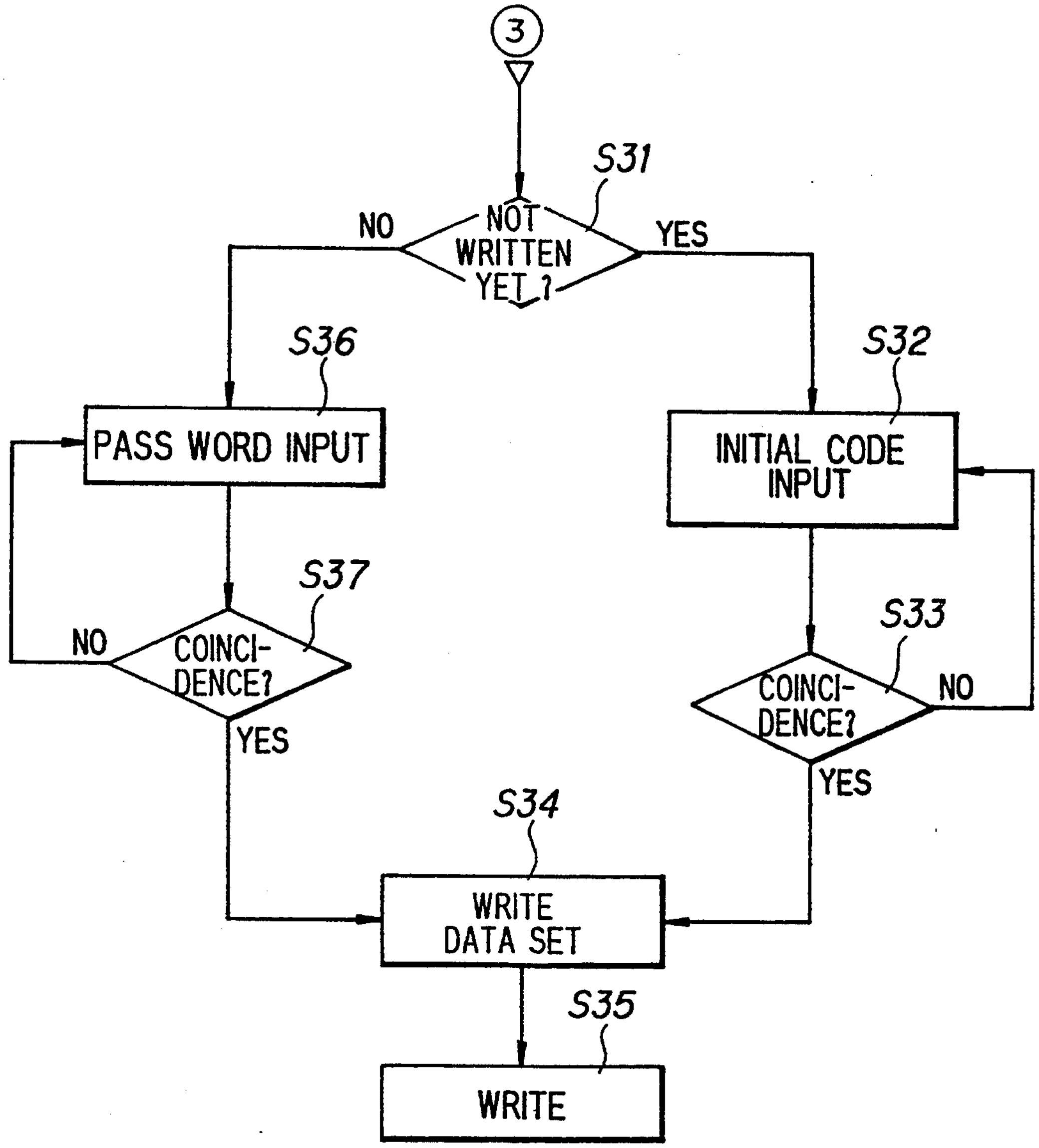
FIG. 5 is a flow chart showing third partial operation of the preferred embodiment.

Next, operation relating to the initial code input unit (86, 88 and 90) will be explained in conjunction with FIG. 5. Before information is written in the EEPROM 22 at an initial state, it is detected whether any information is stored in the EEPROM 22 or not (S31). When no information is stored in the EEPROM 22, an initial code is supplied from the keyboard 44 to the controller 42 (S32), and the input initial code supplied from the input circuit 86 is compared in the operation 88 with the predetermined initial code of the initial code region 64 (S33). At this time, when these codes are not equal, input of initial codes is repeated. When these codes are equal, writing data is set (S34), and the information is written in the EEPROM 22 (S35). On the other hand, when some information is already stored in the EEPROM 22, a pass word is supplied from the keyboard 44 to the controller 42 (S36), and the input pass word is compared with the predetermined pass word of the pass word region 22*a*. At this time, when these pass words are not equal, input of pass words is repeated. When these pass words are equal, writing data is set (S34), and the information is written in the EEPROM 22 (S35).

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A paging radio receiver system, comprising:

a paging radio receiver which is provided with an EEPROM capable of storing a predetermined specific pass word; and an access unit comprising an input apparatus, and a pass word comparator for comparing a pass word supplied from said input apparatus with said specific pass word, and an access circuit for access to said EEPROM;

wherein said pass word comparator supplies an access enabling signal to said access circuit when said supplied pass word is equal to said predetermined specific pass word;

a counter for counting the number of non-coincidences between said input pass word and said predetermined specific pass word;

means for locking an access of said access unit to said EEPROM, when said number of non-coincidences is equal to a predetermined number;

a memory having an unlock code region for storing a predetermined specific unlock code; and said access unit further comprising an unlock code comparator for comparing an unlock code supplied from said input apparatus with said specific unlock code;

wherein said unlock code comparator supplies an unlock signal to said locking means when said supplied unlock code is equal to said predetermined specific unlock code so that said lock state of said access circuit is reset.

2. A paging radio receiver system, according to claim 1:

said memory of said paging radio receiver further comprising an initial code region for storing a predetermined specific initial code; and said access unit further comprising a detector for detecting whether any information is stored in said EEPROM or not and supplying an initial state detecting signal when any information is not stored in said EEPROM; and an initial code comparator for comparing an initial code supplied from said input apparatus with said predetermined specific initial code in accordance with said initial state detecting signal;

wherein said initial code comparator supplies an enable signal to said access circuit when said supplied initial code is equal to said specific initial code so that initial information is written in said EEPROM.

3. A method for access to a paging radio receiver, comprising the steps of:

comparing an input pass word supplied by an operator with a predetermined specific pass word stored in an EEPROM of a paging radio receiver, said comparing is performed only if said predetermined pass word is stored in said EEPROM; and accessing to said EEPROM provided in said paging radio receiver, when said input pass word is equal to said predetermined specific pass word;

counting the number of non-coincidences between said input pass word and said predetermined specific pass word; and locking an access to said EEPROM, when said number of non-coincidences is equal to a predetermined number;

comparing an input unlock code supplied by an operator with a predetermined specific unlock code stored in a memory of said paging radio receiver; and resetting said lock state of said EEPROM, when said input unlock code is equal to said predetermined specific unlock code.

4. A method for access to a paging radio receiver, according to claim 3, wherein initial information is written into said EEPROM according to the steps of:

detecting whether any information is stored in said EEPROM or not;

comparing an input initial code supplied by an operator with a predetermined specific initial code stored in said memory of said paging receiver, when any information is not stored in said EEPROM;

writing initial information in said EEPROM, when said input initial code is equal to said predetermined specific initial code.

5. A paging radio receiver system, comprising:

a paging radio receiver;

a RAM contained in said radio receiver;

an initial code region as part of said RAM for storing a predetermined initial code;

an EEPROM which is capable of either having a predetermined password stored therein, or not having a predetermined password stored therein;

an access unit for programming said radio receiver;

a data entry means for inputting data into said access unit;

an initial code input circuit for inputting an initial code from said data entry means into said access unit;

a detector for detecting whether or not said EEPROM has a password stored therein when an operator supplies data to be written into said RAM, wherein when said detector determines that said EEPROM contains no password, said data is not written into said RAM until an initial code is supplied;

a comparator for comparing said predetermined initial code and said initial code, wherein when said predetermined initial code and said initial code are not equal, said data is not written into said radio receiver until an initial code is entered which is equal to said predetermined initial code, and wherein when said predetermined initial code and said initial code are equal, said data is written into said RAM;

a password comparator, wherein when said detector determines that said EEPROM contains a password, said data is not written into said RAM until a password is entered through said data entry means, whereupon said password comparator compares said password with said predetermined password, and if said password and said predetermined password are not equal, said data is not written into said RAM until a password is entered which is equal to said predetermined password, and if said password and said predetermined password are equal, said data is written into said RAM.

6. A method for accessing a paging radio receiver, comprising the steps of:

storing a predetermined initial code in a RAM in said radio receiver;

attempting to access an EEPROM contained in said radio receiver by an operator;

detecting whether or not said EEPROM has a password stored therein;

denying access, if said EEPROM contains no predetermined password, until a correct initial code is entered;

entering an initial code;

comparing said initial code to said predetermined initial code to determine whether said initial code and said predetermined initial code are equal, thereby judging whether a correct initial code has been entered;

denying access to said EEPROM when said initial code and said predetermined initial code are not equal;

allowing access to said EEPROM if said initial code and said predetermined initial code are equal;

entering a password, if said EEPROM contains a predetermined password;

comparing said password and said predetermined password;

allowing access to said EEPROM if said password is equal to said predetermined password;

denying access to said EEPROM if said password is not equal to said predetermined password.

* * * * *

UNITED STATES PATENT AND TRADEMARK OFFICE

CERTIFICATE OF CORRECTION

PATENT NO. : 5,373,289

DATED : December 13, 1994

INVENTOR(S) : Ichinobe

It is certified that error appears in the above-indentified patent and that said Letters Patent is hereby corrected as shown below:

Column 3, line 42, change "72" (second occurrence), to --74 --;
line 43, change "82" (second occurrence), to --84 --.

Signed and Sealed this

Twenty-fifth Day of April, 1995

Attest:

BRUCE LEHMAN

*Attesting Officer* — *Commissioner of Patents and Trademarks*